July 30, 1940.  O. LOESER, JR  2,209,654
MOBILE SHIELD
Filed May 2, 1938
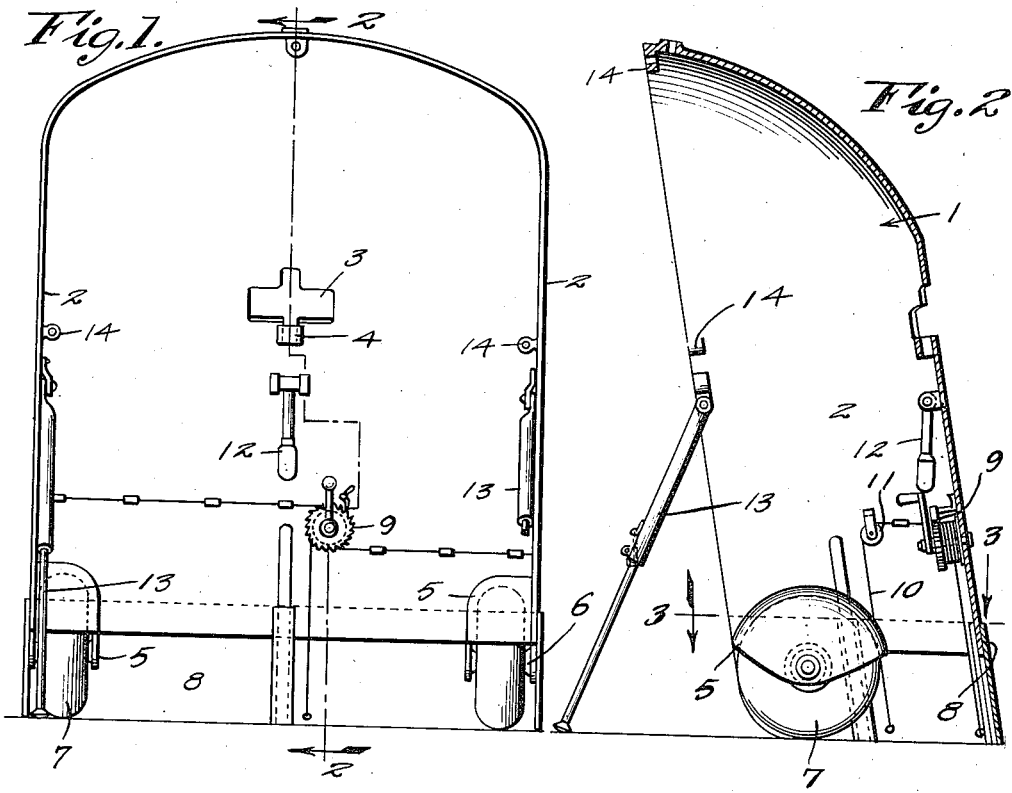
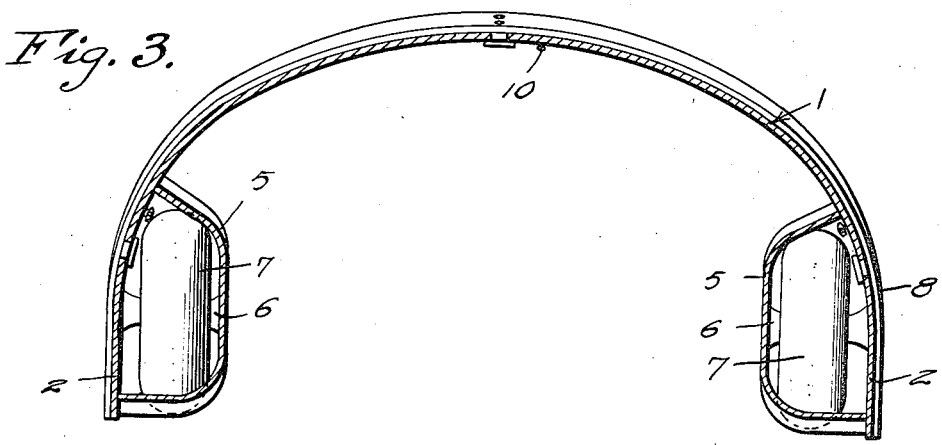
Oscar Loeser Jr,
INVENTOR Patented July 30, 1940

2,209,654

UNITED STATES PATENT OFFICE 2,209,654

MOBILE SHIELD

Oscar Loeser, Jr., Lakewood, N. J.

Application May 2, 1938, Serial No. 205,562

8 Claims. (Cl. 89—36)

This invention relates to mobile shields and has for the primary object the provision of a device of this character which will be bullet and shrapnel resisting and provide an efficient shield for one or more persons and which may be easily moved from one place to another and readily transported on a motor vehicle and thereby provide a device especially useful by law enforcing officers when engaged in gun battles with bandits or outlaws and may be successfully employed by soldiers of arms.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a rear elevation illustrating the mobile shield constructed in accordance with my invention.

Figure 2 is a transverse sectional view taken on line 2—2 of Figure 1.

Figure 3 is a sectional view taken on line 3—3 of Figure 2.

Referring in detail to the drawing, the numeral 1 indicates a shield plate constructed of a material capable of resisting bullets, shrapnel and the like. The plate 1 is shaped to present a protection to one or more persons standing or crouching directly behind the same. The plate is arcuately curved transversely thereof providing substantially parallel sides 2 and a front presenting a curved surface capable of deflecting bullets or shrapnel due to its curvature. The upper portion of the front curves rearwardly towards the vertical rear edges of the sides 2. The front of the plate has formed thereon a sight opening 3 and located adjacent the sight opening is a gun rest or mount 4. The sight opening 3 is so located that a person crouching behind the plate can obtain a clear view over a comparatively large area in front of the plate and still not be unduly exposed.

Wheel fenders or guards 5 are formed on the sides 2 at the lower edges thereof and cooperate with said sides in supporting wheel axles 6 on which wheels 7 are journaled. The wheels permit the device to be easily moved back and forward and turned to the right or left. The guards or fenders 5 protect the person or persons using the device against coming in contact with the wheels 7. The wheels support the lower edge of the plate 1 a distance from the ground so that the device can be easily moved over uneven ground without the plate 1 dragging. A movable section 8 is slidably mounted on the plate 1 and conforms to the general contour of the latter. The section 8 may be lowered into engagement with the ground so as to shield and protect the feet and lower portions of the legs of the person or persons employing the device as well as protecting the wheels 7.

A hand operated winch 9 is mounted on the plate 1 and includes cables 10 trained over pulleys 11 and connected with the section 8 whereby said section may be raised and lowered as desired. A handle 12 is pivotally mounted on the plate 1 below the sight opening 3 and adjacent the winch whereby a person employing the device can easily guide the movement of the device in any direction desired.

Telescopic props 13 are pivotally mounted on the sides 2 of the plate 1 and may be adjusted in engagement with the ground for aiding in supporting the device in an upright position. Apertured ears 14 are formed on the sides and the top of the shield plate capable of receiving suitable fastening mediums for mounting the device on a motor vehicle or for transporting the device from one place to another.

A device of the character described can be easily mounted on a motor vehicle and when needed for use may be readily set up and will provide an effective shield for two or more persons engaged in gun battle. The curvature of the plate 1 is such that bullets or shrapnel striking the same will be deflected aiding in preventing the bullets or shrapnel from puncturing the plate. The device when set up for use can be rapidly moved over uneven surfaces still acting as an efficient protection to the persons employing the device.

What is claimed is:

1. A manually operable shield comprising in combination a shield plate formed with a transversely curved front and top portion, spaced parallel sides integral therewith, and with a sight opening in the front portion; wheels journalled to said sides interiorly thereof; fender elements for said wheels, a vertically slidable guard mounted on the front and sides of said shield and terminating rearwardly of the wheels, a manually actuated drum journaled to the shield interiorly thereof, and cables secured to the drum and engaging the guard at spaced intervals therearound to permit the same to be positioned adjacent the ground or to be elevated a selected distance therefrom or to elevate the same therefrom.

2. A manually operable shield comprising in combination a shield plate formed with a transversely curved front and top portion, spaced parallel sides integral therewith, and with a sight opening in the front portion; wheels journalled to said sides interiorly thereof; fender elements for said wheels; a vertically slidable guard mounted on the front and sides of said shield terminating rearwardly of the wheels, a manually actuated drum journaled to the shield interiorly thereof, cables secured to the drum and engaging the guard at spaced intervals therearound to permit the same to be elevated a selected distance therefrom and handle means for guiding said shield.

3. A manually operable shield comprising in combination a shield plate formed with a transversely curved front and top portion, spaced parallel sides integral therewith, and with a sight opening in the front portion; wheels journalled to said sides interiorly thereof; fender elements for said wheels; a vertically slidable guard mounted on the front and sides of said shield and terminating rearwardly of the wheels, a manually actuated drum journaled to the guard interiorly thereof, cables secured to the drum and engaging the guard at spaced intervals therearound to permit the same to be positioned adjacent the ground or to be elevated a selected distance thereabove; handle means for guiding said shield; and attaching means carried by said shield for mounting the same on a motor vehicle.

4. A manually operable shield comprising in combination a shield plate formed with a transversely curved front and top portion, spaced parallel sides integral therewith, and with a sight opening in the front portion; wheels journalled to said sides interiorly thereof; fender elements for said wheels; a vertically slidable guard mounted on the front and sides of said shield and terminating rearwardly of the wheels, a manually actuated drum journaled to the guard interiorly thereof, cables carried by the drum and engaging the guard at spaced intervals therearound to permit the same to be positioned adjacent the ground or to be elevated a selected distance thereabove, and attaching means carried by said shield for mounting the same on a motor vehicle.

5. A manually operable shield comprising in combination a shield plate formed with a spherically curved front and top portion, and spaced parallel sides integral therewith, and with a sight opening in said front portion; a pair of wheels journalled to said side portions interiorly thereof; a vertically slidable guard positioned on the front and sides of said shield; a hub member rotatably mounted interiorly of the front portion of said shield plate; handle means to rotate said hub member; cables having one end fastened to said guard whereby when the hub is rotated the said guard is caused to be raised or lowered, a gear carried by and rotatable with the said hub, and a pivoted dog engageable with the said gear to hold the same against rotation and to maintain the guard in the selected position.

6. A manually operable shield comprising in combination a shield plate formed with a spherically curved front and top portion, and spaced parallel sides integral therewith, and with a sight opening in said front portion; a pair of wheels journalled to said side portions interiorly thereof; a vertically slidable guard positioned on the front and sides of said shield; a hub member rotatably mounted interiorly of the front portion of said shield plate; handle means to rotate said hub member; cables having one end fastened to said guard whereby when the hub is rotated the said guard is caused to be raised or lowered; a gear carried by and rotatable with the said hub, a pivot dog engageable with the said gear to hold the same against rotation and to hold the guard in the selected position.

7. A manually operable shield comprising in combination a shield plate formed with a spherically curved front and top portion, and spaced parallel sides integral therewith, and with a sight opening in said front portion; a pair of wheels journalled to said side portions interiorly thereof; a vertically slidable guard positioned on the front and sides of said shield; a hub member rotatably mounted interiorly of the front portion of said shield plate; handle means to rotate said hub member; cables having one end fastened to said guard whereby when the hub is rotated the said guard is caused to be raised or lowered; a gear carried by and rotatable with the said hub, and a pivot dog engageable with the said gear to hold the same against rotation and to hold the guard in the selected position, and lugs formed on said shield for mounting the same for transportation by a motor vehicle.

8. A manually operable shield comprising in combination a shield plate formed with a spherically curved front and top portion and spaced parallel sides integral therewith, a pair of wheels journalled to said side portions interiorly thereof, a vertically slidable guard positioned on the front and sides of said shield adjacent the bottom thereof, a hub member rotatably mounted interiorly of the shield plate, handle means to rotate said hub member, cables connecting said hub and the said guard whereby when the hub is rotated the said guard is caused to be raised or lowered, a gear carried by and rotatable with the said hub and a pivot dog engageable with the said gear to hold the same against rotation and to hold the guard in the selected position and lugs formed on said shield for mounting the same for transportation by a motor vehicle.

OSCAR LOESER, JR.